United States Patent Office 2,961,255
Patented Nov. 22, 1960

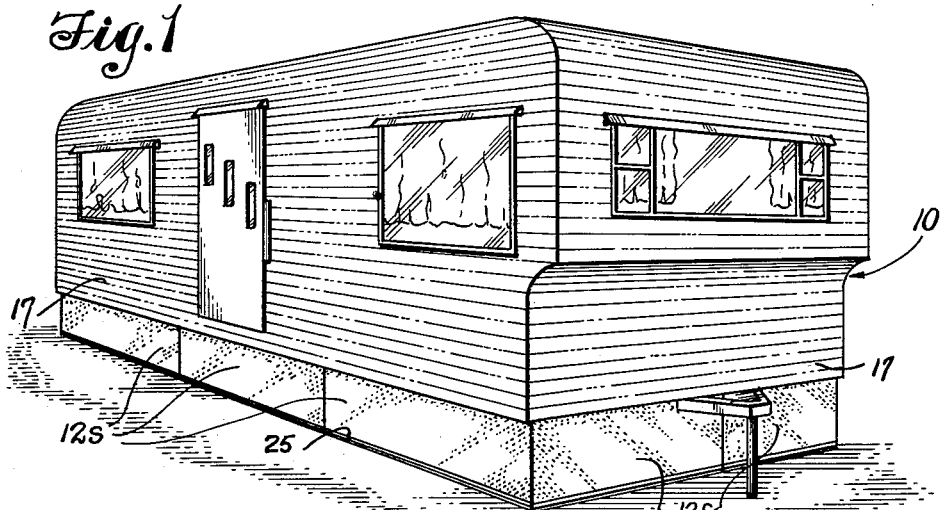

2,961,255

TRAILER SKIRTS

Arthur R. Trott, Clarksfork, Idaho
(Box 212, Hope, Idaho)

Filed July 28, 1958, Ser. No. 751,232

3 Claims. (Cl. 280—150)

This invention relates to improvements in what are designated as trailer skirts; such skirts being designed to close off the open space between the sills of an immobilized house trailer and the ground; the present invention being in the nature of an improvement upon the trailer skirt described and illustrated in my co-pending application filed January 20, 1958, under Serial No. 709,855.

It has been explained in the above numbered co-pending application, that the trailer skirt is applied to an immobilized house trailer to enclose the area beneath it, thus to give the trailer a more attractive appearance; to eliminate the passing of cold or hot winds beneath the trailer floor with resultant discomfort of the trailer occupants and also to enclose the ground area beneath the trailer floor so that it can be advantageously used as a protected storage area. The trailer skirt, as disclosed in the above mentioned pending application is detachable from the trailer body and when functionally applied thereto is secured in place by adhesive tape, tacks or other fasteners of suitable kind.

It is the principal object of the present invention to provide a trailer skirt contained in a housing that is permanently attached to the trailer floor or sidewall; which skirt is wound on a spring powered roller and can be drawn therefrom and from the housing to its position of use and then secured to the ground without the previous inconvenience and time required to extend it along the trailer wall and then tape or otherwise secure it thereto.

It is also an object of the present invention to provide trailer skirts on spring roller mountings that are ready for instant use, and which are enclosed in housings that may be readily, easily and permanently attached for use to the conventional forms of house trailers or which may be an integral part of the trailer body structure.

Still another object of the present invention resides in the provision of means in association with the skirt and roller housings for holding the skirts in their extended positions of use and for anchoring them to the ground and against being blown about by wind currents.

Still further objects and advantages of the invention reside in the details of construction of the various parts and in their combination. Also, in the mode of use of such skirts as will hereinafter be fully described.

In accomplishing the above mentioned and other objects of the invention, I have provided the improved details of construction, the preferred forms of which are illustrated in the accompanying drawings, wherein:

Fig. 1 is a perspective view of an immobilized house trailer equipped with trailer skirts in accordance with the teaching of the present invention.

Fig. 2 is an enlarged cross-section, taken vertically through the skirt and sill portion of the trailer, showing the skirt enclosing housing and a toggle stake as used to anchor the skirt, in an extended position, to the ground.

Fig. 3 is an elevation, showing the inside of a section of the skirt and housing; the medial part thereof being broken away to shorten the view.

Fig. 4 is a vertical cross-section of a skirt as contained in a housing of a different form.

Fig. 5 is a cross-sectional view showing still another form of skirt housing.

Referring more in detail to the drawings:

In Fig. 1, 10 designates, in its entirety, a typical house trailer as immobilized for use as living quarters and as equipped with a skirt in accordance with the present invention. The skirt is here shown to comprise a plurality of sections, 12S, which are placed end to end; it being anticipated that such sections shall be made in various standardized lengths and applied end to end in combinations that best suit the dimensions of the trailer to which they are applied. However, it is not the intent that such sections be confined or limited to short lengths, since it is possible and also is anticipated that they may be made in lengths corresponding to the width and length of trailers of various makes. As shown in Fig. 1, the trailer 10 is equipped at each side with three skirt or curtain sections and has two sections at each end.

Referring now to Figs. 2 and 3, the curtain or skirt section there shown is designated by numeral 12, and it is shown to be wound onto a mounting roller 13. This roller is tubular and is like, or similar to, the well known spring roller as used for support of window shades; being interiorly equipped with an elongated coiled spring 14 that is fixed at one end to the roller and at its opposite end is fixed to a roller supporting trunnion 15 which is axially rotatably mounted in the end of the roller and which extends from the roller and has a fixed mounting in the end of the roller enclosing housing.

The housing, designated in its entirety by reference character H, which encloses each section of skirt or curtain, is preferably made of sheet aluminum but also might be made of other suitable materials including wood. It is permanently attached to the trailer floor structure 16, parallel with and closely adjacent the lower edge portion of the outer wall 17 of the trailer that extends below the floor. Or it might be attached to the wall. It is shown in Fig. 2 that the housing H comprises a top wall 18, outside wall 18a and lower wall 18b. After the roller and curtain have been mounted in the secured housing, the housing is closed at the inside by a wall plate 19 that provides a narrow slot 20 between its lower edge and the inner edge of the lower wall 18b through which the skirt 12 may be outwardly drawn from the roller 13 for its securement along its lower edge against the ground surface, as shown in Fig. 2. The housing H can be securely fixed in various ways to the trailer floor and wall, as for example, by means of screws 22 applied as seen in Fig. 2, through the inturned flange 19′ along the top of the plate 19 and inner edge of the housing top wall 18.

Along its lower edge, the skirt or curtain strip 12 is fixed to a rigid metal strip 25, preferably of angle or T-form. When the skirt is drawn out from the housing for use, this strip 25 is disposed flatly against the ground as in Fig. 2 and may be there secured as, for example, by means of pegs or pins 26 applied through holes therein, shown in Figs. 4 and 5. Such pins will hold the curtain close to the ground and prevent its being blown back and forth by wind currents.

Another means for holding the curtain extended and also for anchoring it to the ground has been illustrated in Figs. 2 and 3. This means comprises a pair of toggle stakes 30 that are pivotally fixed at their upper ends, as at 31 in Fig. 2 to the inside of the housing wall plate 19. Preferably, such stakes would be placed near opposite ends of the housing. Each stake comprises an upper and a lower end section; these having ends pivotally joined by a pivot bolt 32. When the curtain is not in use, the two sections of a stake may be folded together and disposed horizontally along the wall plate 19, as has been shown in dash lines at the right hand end of the housing in Fig. 3. To use these stakes after the curtain has been drawn down from the housing and the strip 25 at its lower edge placed against the ground as in Fig. 2, the two pivotally joined sections are extended and swung downwardly to the positions shown in Fig. 3. In bringing each stake to this position, the pointed lower end portion of the lower section is projected through a hole 35 in the strip 25 and pressed into the ground. The stake is shouldered near its lower end as at 36 in Fig. 3. This shoulder engages the strip and serves to hold it firmly against the ground. When the toggle stakes are withdrawn from the strip, the spring tension of the roller winds the skirt thereon and the strip 25 closes over the slot 20 in the housing through which the curtain extends. Suitable ties or latches may be applied to the plate 19 for use in holding the folded stakes in raised position during travel of the trailer.

The skirt housing H shown in Fig. 4 is formed as a downward and upturned continuation of the sidewall 17 of the trailer body while that of Fig. 5 is formed separately from the trailer structure and is later secured thereto. This latter housing is shown to be equipped with a hingedly attached inside wall member 19x to permit easy application of the roller thereto.

Housings of the kinds disclosed, whether formed as an integral part of the trailer wall or indepedently thereof and later attached, protect the skirt 12 while wound on the roller 13 and also serve as a means for the functional mounting of the roller.

By use of the means above disclosed, the trailer skirt is maintained ready for use while the vehicle is traveling and then can be easily and readily drawn out to position of use and secured when the trailer is parked or immobilized. The present skirt is a practical convenient and serviceable means for keeping cold winds from blowing beneath the trailer floor when immobilized.

What I claim is:

1. In combination with an immobilized vehicle of the character described having a body supported above ground surface level, curtain housings applied exteriorly to said trailer body along its sill portions, curtain rollers supported in said housings, lengthwise thereof, curtains of flexible material wound on and adapted to be drawn downwardly therefrom across the space between said sill portions and the ground surface and serving together to form a single trailer skirt for said immobilized vehicle; each curtain having a rigid metal strip fixed thereto along its lower edge, and a plurality of toggle links, each with its upper end pivotally fixed to a support that is fixed relative to the corresponding curtain housing and having its lower end adapted to be holdingly engaged with the rigid strip as attached to the extended curtain and to enter the ground surface to coact with other links to hold the trailer skirt in extended functional position.

2. The combination recited in claim 1 wherein said rigid metal strips are formed with holes therethrough and wherein the lower end portions of the links are pointed for projection to limited extent through holes of said strips and into the ground to retain the skirt extended and its lower edge in fixed relationship to the ground.

3. The combination recited in claim 1 wherein the skirt anchoring toggle links comprise pivotally joined upper and lower end sections, adapted to be folded together when not in use and swung upwardly against and disposed along the housings, and to be extended in use; the pointed lower end sections of the toggles having shoulders to limit the extent of passage of the points through the holes and into the ground beneath the strips.

References Cited in the file of this patent

UNITED STATES PATENTS

| | | |
|---|---|---|
| 667,475 | Winter et al. | Feb. 5, 1901 |
| 1,351,085 | Witt | Aug. 31, 1920 |
| 2,395,303 | Stableford | Feb. 19, 1946 |
| 2,618,493 | Fransen et al. | Nov. 18, 1952 |